Figure 1:
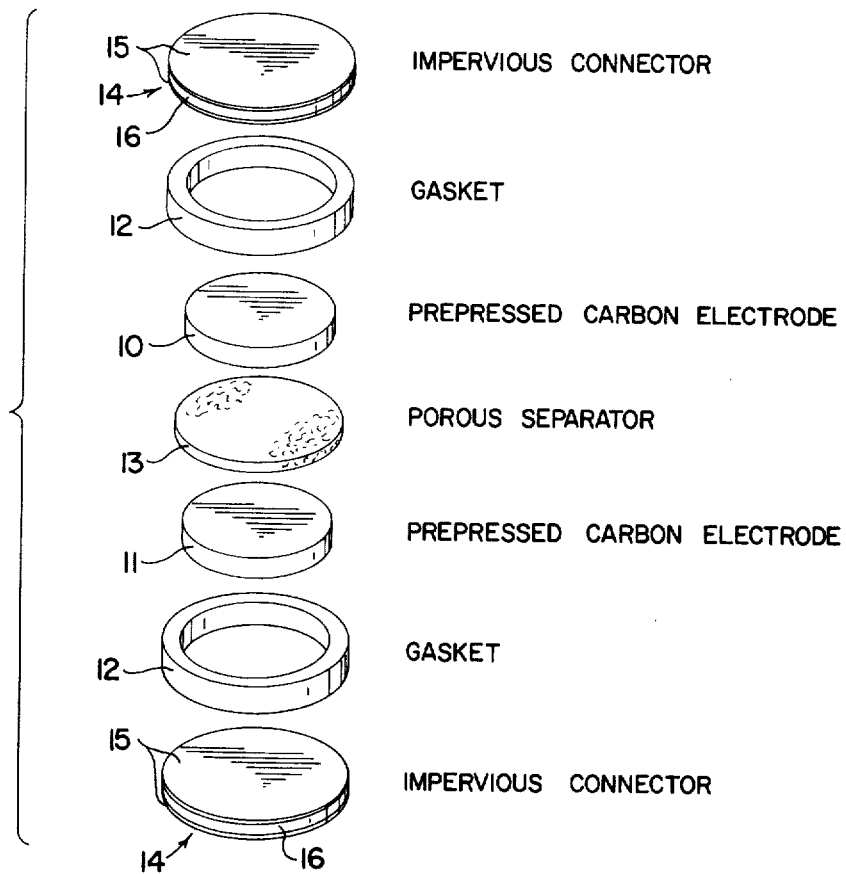

United States Patent [19]

Selover, Jr. et al.

[11] 4,023,079

[45] May 10, 1977

[54] GRAPHITE-ELASTOMER SANDWICH AS IMPERVIOUS CONNECTOR FOR AN ELECTRICAL CAPACITOR

[75] Inventors: Theodore B. Selover, Jr., Shaker Heights; Donald L. Boos, Garfield Heights, both of Ohio

[73] Assignee: Standard Oil Company, Cleveland, Ohio

[22] Filed: Nov. 15, 1973

[21] Appl. No.: 416,034

Related U.S. Application Data

[63] Continuation-in-part of Ser. No. 261,287, June 9, 1972, abandoned.

[52] U.S. Cl. .................. 361/433; 29/630 R; 156/309; 156/327; 156/333; 429/161
[51] Int. Cl.² .................. H01G 9/02; H01G 9/10
[58] Field of Search .............. 136/135 R; 317/230, 317/231, 232; 156/309, 327, 333; 29/630 R

[56] References Cited

UNITED STATES PATENTS

| 2,572,017 | 10/1951 | Ellis | 136/135 R |
| 3,214,647 | 10/1965 | Louzos et al. | 317/230 |
| 3,262,818 | 7/1966 | DiPasquale et al. | 136/135 R |
| 3,288,641 | 11/1966 | Rightmire | 317/230 |
| 3,536,963 | 10/1970 | Boos | 317/230 |
| 3,634,736 | 1/1972 | Boos et al. | 317/230 |
| 3,648,126 | 3/1972 | Boos et al. | 317/230 |
| 3,652,902 | 3/1972 | Hart et al. | 317/230 |
| 3,656,027 | 4/1972 | Isley | 317/230 |

*Primary Examiner*—William D. Larkins
*Attorney, Agent, or Firm*—Herbert D. Knudsen; Evelyn R. Kosman

[57] ABSTRACT

The electron-conducting, ion-insulating connector of this invention comprises a sandwich structure of two layers of a thin, flexible graphite sheet having interposed therebetween an electrically-conductive polymer. These connectors are particularly suitable for use in paste electrode capacitors wherein the electrodes are composed of either carbon or metal particles in admixture with a liquid electrolyte.

17 Claims, 2 Drawing Figures

GRAPHITE-ELASTOMER SANDWICH AS IMPERVIOUS CONNECTOR FOR AN ELECTRICAL CAPACITOR

This patent application is a continuation-in-part of patent application Ser. No. 261,287, filed June 9, 1972 now abandoned.

This invention relates to an improved electrically-conductive, impervious connector for use in an electrical capacitor. More particularly this invention relates to an intercell electron-conducting, ion-insulating connector that is chemically inert to the corrosive electrolyte of a capacitor designed for use at elevated temperatures. The impervious connector of this invention is particularly suitable for use in paste electrode capacitors as described in U.S. Pat. Nos. 3,536,963, 3,634,736 and 3,648,126.

The connector which is the subject of the present invention comprises two layers of thin, flexible, graphite sheet or tape having interposed therebetween an electrically-conductive polymer. An electrically-conductive polymer, in accordance with this invention, is one in which electrical conductivity is imparted to the polymer by blending an electrically-conductive carbon black into the polymer.

The structure of this connector represents an improvement over that described in U.S. Pat. No. 3,656,027 which discloses an electron-conducting connector comprising a single metal or graphite substrate having an electrically-conductive polymer laminated to one side of the substrate. The connector of the present invention unexpectedly displays a lower electrical resistance in a capacitor than that of the prior art due to the positioning of a second sheet of graphite between the electrode of the capacitor and the polymer layer. This second graphite layer provides a continuous conductive path between the electrode and the carbon particles of the polymer layer. The lower resistivity of the sandwich-type connector of the present invention is surprising in view of the added thickness of a second layer of graphite in the connector.

The degree of improvement in conductivity obtained with the connector of this invention over that of the prior art is highly significant at the low level of total series resistance for the capacitor containing the connector. In addition to low resistivity, the connector of this invention is further characterized as having chemical and thermal stability in the presence of strong oxidizing acids at elevated temperatures, it meets the requirements for use in a capacitor operable within the range of 40° to 100° C, and it also sustains low liquid and gas permeability throughout the life of the capacitor.

The graphite sheet or foil composing the outer layers of the connector of this invention may comprise any available thin, flexible, graphite sheet or foil having a thickness in the range generally from about 0.3 to 10 mils. Sheet or foil having thicknesses above this range usually contribute excessively to the resistance of the capacitor while thinner sheets or foils generally do not withstand extensive handling.

Readily available forms of graphite sheet that are suitable for the connector of this invention are graphite sheet prepared from expanded, compressed graphite particles, having anisotropic electrical properties, as described in U.S. Pat. No. 3,404,061, and wherein the anisotropy ratio, i.e. the ratio of the specific conductivity along the surface plane "A" to the specific conductivity along the perpendicular plane "C" is between about 1 and 1000 at room temperature. The graphite sheet need not be limited to these types of graphite, however, and any electrically-conductive, flexible, graphite sheet or foil falling within the desired range of thickness should be operable.

Flexible graphite sheets and foils possess all of the desired properties for use as a chemically stable connector with the exception of porosity. Untreated graphite sheet or foil is too porous for the purpose intended in this invention, and it acts as a wick, readily absorbing the electrolyte from the capacitor. In accordance with this invention, in order to render the graphite sheet impermeable, a layer of conductive polymer is interposed between the two sheets of graphite to form a sandwich structure. Preferable the conductive polymer is one that can be blended with a sufficient amount of electrically-conductive carbon black to give the desired level of conductivity. Because high concentrations of carbon black are required for this purpose, elastomers are generally more satisfactory than high modulus resins. The preferred elastomers are those in which sufficient amounts of carbon black can be added to increase the conductivity or conversely to lower the resistance of the elastomer to within the range of about $10^{-4}$ ohm-in$^2$/mil.

The elastomers suitable for the connector of this invention are the natural rubbers and the synthetic rubbers obtained from ethylene, propylene, isobutylene, butadiene, isoprene, chloroprene, copolymers of styrene-butadiene, copolymers of isobutylene with various conjugated dienes wherein the amount of the diene does not exceed about 5 percent, as for example the butyl rubbers, chlorobutyl rubbers, chlorosulfonated polyethylene, vinylidene fluoride polymers, polybutadiene-urethane polymers, polyarylsulfones, ethylene-propylene terpolymers, nitrile rubbers, and Thiokol rubbers. Preferred are the butyl rubbers because of their chemical stability, low permeability and their ability to retain large amounts of conductive carbon black without the degradation of other properties of the rubber.

The carbon blacks suitable for the purpose of this invention are preferably finely divided, electrically-conductive furnace blacks that are produced by the thermal decomposition or incomplete combustion of petroleum oil or natural gas. Although operable, but less preferred in this invention are the channel blacks, acetylene blacks, or blacks made fine by grinding, and graphite powder. The carbon blacks are advantageously added to the rubber on a weight basis in concentrations ranging from 50 to 200 parts of carbon black per hundred parts of rubber, and preferably from 75 to 175 parts of the carbon black per hundred parts of rubber.

The electrical conductivity of the carbon-filled elastomers is strongly dependent upon the network structure and the degree of dispersion of the carbon in the rubber matrix. The use of heat treatment and the addition of promoters to break up agglomerates and to give more carbon chain linkage per unit weight of carbon greatly enhance the electrical properties of the rubber. For example, beneficial results are obtained by mixing of the elastomer and carbon at temperatures of from about 150° to 235° C. Additional conductivity may also be realized by adding a promoter to the rubber, such as, for example, p-dinitrosobenzene, N-methyl-N, 4-dinitrosoaniline, and N(2-methyl-2-nitropropyl)-4 nitrosoaniline. The promoter may be advantageously incorporated into the rubber in concentrations ranging from 0.05 to 0.6 parts by weight of active ingredient per 100 parts of rubber.

The rubber-carbon black blends may be applied to the graphite substrate by any one of several methods known to those skilled in the art. For example, they may be applied by calendering, silk screening, spray coating, brush coating, and the like. For some of the applications the carbon-filled elastomer is mixed with a suitable hydrocarbon or substituted hydrocarbon solvent to obtain the desired consistency for the particular method of application employed. Solvent systems include aliphatic, aromatic and naphthenic hydrocarbons, and solvents such as, for example, toluene, xylenes, cyclohexane, and n-hexane are especially preferred. For most applications it is desirable to calender or to pre-press a sheet of the carbon-saturated elastomer in a heated platen press to obtain the desired thickness and place the pre-pressed sheet of rubber between the graphite foil layers.

The elastomer layer should be of sufficient thickness to provide impermeability to the electrolyte and at the same time not so thick as to increase the overall electrical resistance of the capacitor beyond the desirable limits. Generally, a thickness of at least two mils is found to be essential to provide the protection required, and the layer should not exceed a thickness of about 10 mils so as not to increase the resistance of the overall system beyond the acceptable range.

In order to promote good surface contact and adhesion between the elastomer layer and the graphite layer, it is advantageous to clean the surfaces of the elastomer and the graphite with appropriate solvents in order to remove any oils, greases or contaminants which might affect bonding between the two materials. For example, the graphite surface may be cleaned with a hydrocarbon solvent, and the elastomer surface with a solvent that has a high volatility and a low tendency to swell the rubber, as for example, n-hexane, n-heptane, isooctane, benzene, toluene, and the like.

In order to insure impermeability and to lower the interfacial resistance between the conductive rubber and the graphite sheet substrate, the conductive elastomer is sealed to the graphite substrates by compression molding followed by curing by anyone of several methods, as by exposure to nuclear radiation, ultraviolet light, infrared radiation, steam, hot air, or preferably, vulcanization under pressure. In the vulcanizing treatment, the carbon-filled elastomer is mixed with the usual vulcanizing agents such as accelerators, antioxidants, antiozonants, waxes, stabilizers, promoters etc., and the entire graphite-rubber composite is subjected to a cure at elevated temperatures and pressures.

The pressure, temperature and time suitable for vulcanizing the graphite-elastomer composite are dependent upon the scorch time, vulcanizing time and flow characteristics of the particular elastomer used. It is also advantageous to preheat the graphite-elastomer sandwich without the application of any pressure to allow for gases, such as, water vapor and solvent to escape before curing takes place.

The cure may be carried out under constant conditions or in stages wherein a higher pressure is used in the first stage of the cure and a lower pressure in the final cure. Although the use of high pressure is desirable from the standpoint of achieving intimate contact between the rubber and the graphite substrates and obtaining the desired thickness of the sandwich, pressures above certain levels may result in tearing of the graphite and disrupting the rubber-graphite lattice. The lesser pressure accomplishes curing of the rubber without continued rubber flow.

Generally, the graphite-rubber sandwich may be cured within the limits of from room temperature to 220° C and at pressures of from about 15 to 13,500 psi, for a period of time ranging from about 1 minute to 24 hours, depending on the temperature of cure and the type of polymer employed. For example, a laminate may be cured at room temperature for a period of 24 hours. The optimum time of cure for butyl rubber, for example, is that time required to achieve about 95 percent cure of the rubber based on torque measurements on an oscillating disk rheometer. Preferably the curing sequence for butyl rubber is carried out by preheating the rubber-graphite composite to a temperature in the range of about 150° to 190° C for a period of about 1 to 12 minutes to drive off volatile components and then curing in stages, the first stage being carried out at a temperature in the range of 150° to 190° C, at a pressure of about 5000 to 13,500 psi for 1 to 10 minutes, and the second stage at 300 to 1000 psi for about 5 minutes to one hour.

Figure 2:
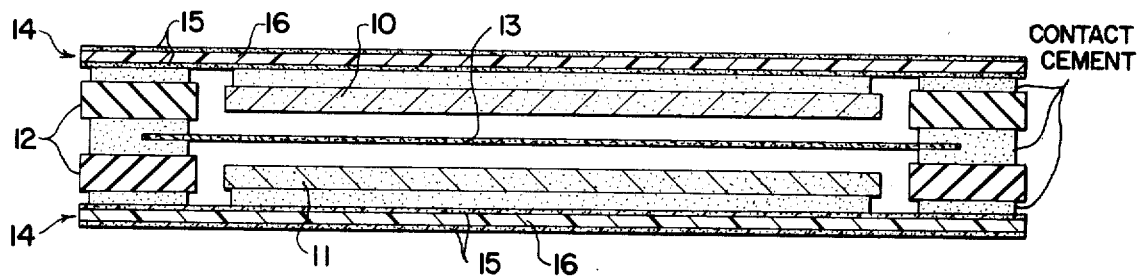

The invention will be more readily understood from the following detailed description taken in conjunction with the drawings wherein an exploded view of the component parts of a single cell electrical capacitor containing the impervious connector is shown in FIG. 1, and a cross sectional view of the assembled cell is shown in FIG. 2.

The cell shown is an example of a paste electrode capacitor which essentially comprises a pair of carbon paste electrodes 10, 11, a porous separator 13, and a pair of electron-conducting and ionic-insulating connectors 14. The primary functions of connector 14 are as a current collector and an inter-cell ionic insulator. While FIG. 2 illustrates one embodiment of the capacitor of this invention, in another preferred embodiment, however, the inner surfaces of connectors 14 are in direct contact with the outer surfaces of electrodes 10 and 11.

In the configuration of the impervious connector 14 shown in FIGS. 1 and 2, the conductive elastomer layer 16 is bonded to the two graphite layers 15. An annular means or a gasket 12 is preferably cemented or in some manner affixed to conducting member 14. Since paste electrodes 10 and 11 are not rigid masses but are to some extent flexible, the principle function of gasket 12 is to confine the electrodes 10 and 11 and prevent the mass of the electrode material from seeping out. The gasket is constructed from an insulating material and is flexible to accommodate expansion and contraction of the electrode and flexing of the cell.

Separator 13 is generally made of a highly porous material which functions as an electronic insulator between the electrodes yet allows free and unobstructed movement to the ions in the electrolyte. The pores of the separator 13 must be small enough to prevent contact between the opposing electrodes, since such a condition would result in a short circuit and consequent rapid depletion of the charges accumulated on the electrodes. Generally, conventional battery separators may be utilized, however, the separator can also be a non-porous, ion-conducting film, such as an ionexchange membrane. Prior to its use, it is advantageous to saturate the separator with electrolyte. This can be accomplished by soaking the separator in the electrolyte for a period of time of up to about 15 minutes.

The carbon electrodes 10 and 11 consist of activated carbon particles in admixture with the electrolyte. Because electrical energy storage of a capacitor is apparently based on surface area, an increase in energy storage can be expected from an increase in surface area of the carbon particles, as by activation. A detailed description of the electrical capacitor having carbon paste electrodes is more fully disclosed in U.S. Pat. No. 3,536,963.

Paste electrode 11 may also comprise a paste formed from the electrolyte in admixture with solid particles of boron carbide or a refractory hard metal carbide or boride wherein the metal may comprise tantalum, niobium, zirconium, tungsten and titanium, as more fully disclosed in U.S. Pat. No. 3,634,736. Also paste electrode 11 may comprise a mixture of the electrolyte and a metal powder of copper, nickel, cadmium, zinc, iron, manganese, lead, magnesium, titanium, silver, cobalt, indium, selenium and tellurium, as disclosed in U.S. Pat. No. 3,648,126.

The electrolyte may consist of a highly conductive medium such as an aqueous solution of an acid, base or salt. In applications wherein high conductivity is required, 30 percent sulfuric acid is especially preferred. Non-aqueous electrolytes can also be used, and solutes such as metal salts of organic and inorganic acids, ammonium and quaternary ammonium salts, etc. may be incorporated in organic solvents. In instances where one electrode may comprise a metal powder in admixture with the electrolyte, it is preferred that the electrolyte be a non-corrosive media such as a base, salt or non-aqueous media.

In the assembly of the cell, the component parts are assembled in the order as shown in the accompanying FIGS. 1 and 2 and the cell is then compressed at a pressure sufficient to render the unit a coherent structure. Pressures in the range of about 240 psi have been found sufficient for this purpose.

The following examples summarized in Tables 1 to III illustrate the advantages associated with the connector of the present invention, and Examples 8, 9, 13, 15 and 17 represent specific embodiments of this invention. The scope of this invention, however, is not to be limited by these examples.

EXPERIMENTAL

The graphite sheet utilized in Examples 1 through 18 was a thin, flexible sheet, having a thickness of 5 mils, and was produced from compressed, expanded graphite particles according to the process described in U.S. Pat. No. 3,404,061. The graphite sheet had the following properties:

| Property | Approximate Value |
|---|---|
| Bulk Density (lb/cu ft) | 60 – 80 |
| Ash Content (weight %) | <0.1 |
| Melting Point - Does not melt; sublimes at 6600° F. | |
| Elastic Modulus, Tensile ($10^6$ lb/sq in) | 0.2 |
| Helium Admittance: 0.005 in thick foil ($cm^2$/sec) | $2 \times 10^{-4}$ |
| laminated bodies ($cm^2$/sec) | $5 \times 10^{-5}$ |
| Electrical Resistivity: Specific Resistivity (surface plane or "a" direction) ($10^{-4}$ ohm-cm) | 8 |

| Property | Approximate Value |
|---|---|
| Ratio of Specific Conductance (surface plane "a"/through thickness "c") | 62.5 |

EXAMPLES 1 to 8

The rubber utilized in Examples 2 to 8, Table I, had the following composition:

| | Parts by weight |
|---|---|
| Butyl rubber (98% isobutylene-2% isoprene) | 100 |
| Extra-conductive carbon black | 125 |
| Stearic acid | 2 |
| Zinc oxide | 5 |
| Tetramethylthiuram disulfide | 1.25 |
| Paraffin | 2 |
| Sulfur | 2 |
| 2-Mercaptobenzothiazole | 0.75 |
| N-Methyl, N-4-dinitrosoaniline (33 wt. % on Whitex clay support) | 1.2 |

The Banbury mixed and milled rubber sheets, ⅛ inch thick, were pre-pressed at 7000 psi for 5 minutes between two layers of Teflon-coated aluminum foil using 0.2 to 0.3 gm/in²/mil of raw rubber in order to obtain cured samples having a thickness of 10.8 ± 1.7 mils and a cross sectional area of 4.65 inch².

In each example, the rubber was cured at a pressure of 7000 psi, for 28 minutes, and at a temperature of 165° C in order to attain 95 percent of full cure based on torque measurements utilizing an oscillating disk rheometer.

In Example 2 the rubber was cured between Teflon-coated aluminum foil with the rubber surfaces in contact with Teflon to give smooth surfaces.

In Example 3 the rubber surfaces were cured in contact with a fine mesh Teflon-coated glass bleeder cloth to give rough surfaces.

In Example 4 the rubber was cured as in Example 2 and a graphite sheet was placed in contact with one surface of the rubber after cure.

The rubber in Example 5 was cured as in Example 3 with one sheet of graphite foil placed in contact with the rubber surface after cure.

In Example 6 the procedure of Example 4 was repeated, but an additional sheet of graphite was placed in contact with the second rubber surface, forming a sandwich configuration.

The connector in Example 7 was produced by curing the rubber in contact with a sheet of graphite foil on one surface of the rubber and Teflon-coated aluminum on the other surface of the rubber. The Teflon-coated aluminum was removed unbonded after curing.

In Example 8 the rubber was cured while in contact with two sheets of graphite foil of identical cross sectional area forming a sandwich configuration.

Resistance measurements for Examples 1 to 8, and summarized in Table I, were made by placing the test samples between two hexagonal pieces of metal foil, 4 mils thick and 4.65 inch² in area, and consisting of 18 K gold-silver roll bonded onto 70–30 copper-nickel, with the gold surface facing the sample. On the outside on either end in contact with the copper-nickel surface were placed aged brass plates of the same area for electrical contact. A constant DC current of 1000 milliamperes was applied to each brass plate, and the DC voltage was recorded while the samples were held under a compression of 1000 pounds of force. The resistances were then calculated from Ohm's law.

Table I

| Example | | Resistance, milliohms |
|---|---|---|
| 1 | Graphite Sheet | 0.1 |
| 2 | Conductive butyl rubber (smooth) | 2.4 |
| 3 | Conductive butyl rubber (rough) | 3.7 |
| 4 | Single graphite sheet-conductive butyl rubber (smooth) | 1.7 |
| 5 | Single graphite sheet conductive butyl rubber (rough) | 3.1 |
| 6 | Graphite sheet-conductive butyl rubber (smooth), sandwich configuration | 1.8 |
| 7 | Conductive butyl rubber (smooth) cured in contact with single graphite sheet | 1.6 – 1.9 |
| 8 | Conductive butyl rubber (smooth) cured in contact with two sheets of graphite (sandwich configuration) | 1.0 – 1.3 |

EXAMPLES 9 to 12

In Examples 9 to 12 the connectors of Examples 4 to 8, Table I, were incorporated into capacitors each of which consisted of a pair of carbon paste electrodes prepared from a mixture of activated carbon (Nuchar C-115) and 30 percent aqueous sulfuric acid, and a pair of non-conductive butyl rubber gaskets. The cross sectional area of each cell was 4.65 inch². The cells in these examples were not sealed. Resistance measurements were made by the same method as in Examples 1 to 8 with the exception that the compression force was varied as indicated in Table II.

Table II

| | | Resistance at Room Temp. of Open Cell, Milliohms, Force applied to sample, lbs. | | | | | |
|---|---|---|---|---|---|---|---|
| Ex. | Connector Configuration | 250 | 300 | 1000 | 1500 | 2000 | 2500 |
| 9 | Connector of Ex. 8 | 5.0 | 3.4 | 2.6 | 2.4 | 2.2 | 2.1 |
| 10 | Connector of Ex. 7 | 7.6 | 4.9 | 3.5 | 3.1 | 2.8 | 2.7 |
| 11 | Connector of Ex. 4 | 9.2 | 5.7 | 4.3 | 3.7 | 3.6 | 3.5 |
| 12 | Connector of Ex. 5 | 13.4 | 7.9 | 6.3 | 5.5 | 5.3 | 5.0 |

EXAMPLES 13 to 18

The compositions of the rubbers employed in Examples 13 to 18 were as follows:

| Pre-Pressed and Calendered Rubbers | |
|---|---|
| Butyl Rubber | Parts by Weight |
| Butyl rubber (98%-isobutylene-2% isoprene) | 100 |
| Extra-conductive carbon black | 125 |
| Stearic acid | 2 |
| Tetramethylthiuram disulfide | 1.25 |
| Zinc oxide | 5 |
| Paraffin | 2 |
| Sulfur | 2 |
| 2-Mercaptobenzothiazole | 0.75 |
| Chlorobutyl Rubber | Parts by Weight |
| Chlorobutyl elastomer | 100 |
| Extra-conductive carbon black | 125 |
| Stearic Acid | 1 |
| 2,2'-Methylene-bis (4-methyl-6-t-butyl phenol) | 0.5 |
| 4,4'-Dithiodimorpholine | 1 |
| Phenol-formaldehyde cross-linking agent | 1 |
| Tellurium diethyldithiocarbamate | 1 |

The rubbers in Examples 13 to 18 were milled and sheeted as in Examples 2 to 8 and were then cured at a temperature of 165° C for 40 minutes under a pressure of 7000 psi.

In Examples 13, 14, 17 and 18 the rubber was pre-pressed prior to curing, as in Examples 2 to 8, and in Examples 15 and 16, the milled rubber was calendered prior to curing. The rubbers in Examples 13, 15 and 17 were cured while sandwiched between two sheets of graphite, and in Examples 14, 16 and 18 the rubbers were cured in contact with a single sheet of graphite, as in Example 7. In each example, the thickness of the elastomer layer was measured after curing by subtracting the thickness of the compressed graphite sheet (average of 3 mils for each layer) from the total thickness of the connector.

The connectors prepared in Examples 13 to 18 were then incorporated into paste electrode capacitors and the equivalent series resistance of the total assembly was measured. The results of these measurements along with the measurements of the thickness of the elastomer layer in each connector are summarized in Table III.

The capacitors contained ion permeable electrode separators composed of an anisotropic polymer membrane, and carbon paste electrodes prepared from a mixture of active carbon and 30 percent aqueous $H_2SO_4$ electrolyte, as described in Examples 9 to 12, and they were fully sealed. Cross sectional area of these capacitors was 1 inch² based on a 1 ⅛ inch O.D. disc. The active carbon electrode had a ⅞ inch I.D. surrounded by a ⅛ inch circular gasket composed of a copolymer of vinylidene fluoride and hexafluoropropylene.

The resistances of the capacitors were measured at room temperature and at 85° C. A force of 2000 psi was applied to the clamped cells and the pressure was held constant throughout the resistance measurements. The equivalent series resistance measurements were made by applying a 1 ampere AC current to aged brass plugs in contact with each end of the capacitor, and the voltages determined.

Table III

| Ex. | Connector | Configuration | Thickness of elastomer layer in connector, in mils[1] | ESR of capacitor cont'g connector, in milliohms[3] | |
|---|---|---|---|---|---|
| | | | | Rm. Temp. | 85° C |
| 13 | Pre-pressed butyl rubber | Sandwich (2 sheets of graphite) | 2.8 | 19 | 17 |
| 14 | Pre-pressed butyl rubber | Single sheet of graphite | 3.0 | 29 | 22 |
| 15 | Calendered butyl rubber sheet | Sandwich (2 sheets of graphite) | 3.0 | 17 | 13 |
| 16 | Calendered butyl rubber sheet | Single sheet of graphite | 2.6 | 22 | 17 |
| 17 | Pre-pressed chlorobutyl rubber | Sandwich (2 sheets of graphite) | 3.4[2] | 19 | 14 |
| 18 | Pre-pressed chlorobutyl rubber | Single sheet of graphite | 2.8 | 29 | 23 |

[1]Average measurements for 3 connectors
[2]Measurement for a single connector
[3]Average measurements for 3 cells The examples shown in Table I illustrate the advantages associated with a connector having a sandwich configuration (2 layers of graphite) in Example 8, as compared with the use of a single layer of graphite as in Example 7. The examples in this table also illustrate the advantage observed in using the sandwich structure with butyl rubber cured in contact with the graphite sheet as compared with a connector in which the rubber was cured by itself and the connector assembled by subsequently adding the graphite sheet, as in Example 6.

The effect of pressure on lowering resistance in four different connector configurations in the range of 250 to 2500 pounds of force is shown in Examples 9 to 12 and summarized in Table II. Here again, at all pressures, the integrally-cured graphite sheet-butyl rubber sandwich displayed the lowest resistance. These examples also demonstrate that the resistance of the integrally-cured graphite sheet-butyl rubber sandwich is least sensitive to the pressure effect. This aspect of the connector is particularly desirable in balancing cell resistances to avoid large changes in resistance with slight pressure changes.

The examples in Table III show comparisons of the integrally-cured sandwich configuration, Examples 13, 15 and 17, with the single graphite sheet configuration, Examples 14, 16 and 18, for two types of rubber and for two methods of pre-forming the rubber layer. In each of the three sets of comparisons, the sandwich structure has a significantly lower equivalent series resistance in working capacitors at both room temperature and at 85° C. These data illustrate that there is a definite advantage in employing the connector of the present invention over that of the single graphite layer configuration.

The measurements of the thickness of the elastomer layers in the connectors of Examples 13 to 18 indicate the thickness variation of the elastomer layers to be small, and penetration of the elastomer into the graphite with the application pressure is essentially negligible.

These data also show that in two out of the three comparative examples (Examples 15 and 16; 17 and 18) that although the rubber layer in the sandwich-type connector is thicker than in the single graphite sheet connector, the resistances contributed by the sandwich-type connectors to the overall series resistances of the capacitors were significantly lower. In Example 14, the small decrease in thickness of the elastomer layer in the single graphite layer connector compared with that of the sandwich-type connector in Example 13 does not nearly account for the magnitude of the decrease in resistance observed for the sandwich composite in this example. This lower resistivity of the sandwich-type connector is explained in terms of better contact efficiency due to the presence of a continuous conductive graphite layer between the carbon electrode of the capacitor and the carbon particles in the carbon-filled elastomer layer of the connector.

We claim:
1. An electron-conducting, impervious connector comprising two layers of a thin, flexible, graphite sheet having interposed therebetween an ion-insulating elastomer having electrically-conductive carbon black blended therein for imparting electrical conductivity thereto, said elastomer and graphite layers forming an electronically conductive, ion-insulating, sandwich structure.

2. The connector in claim 1 wherein the elastomer in the graphite-elastomer composite has been pressure-cured at a temperature from about room temperature to 220° C and at a pressure at from about 15 to 13,500 psi.

3. The connector in claim 2 wherein the elastomer is a member selected from the group consisting of butyl rubber and chlorobutyl rubber.

4. The connector in claim 3 wherein the elastomer has blended therein from about 50 to 200 parts by weight of electrically-conductive carbon black per 100 parts of elastomer.

5. The connector in claim 4 wherein the graphite sheet has a thickness ranging from about 0.3 to 10 mils.

6. The connector in claim 5 wherein the elastomer layer has a thickness ranging from about 2 to 10 mils.

7. The connector in claim 6 wherein the elastomer in the graphite-elastomer composite is cured by vulcanizing.

8. The connector in claim 7 wherein the graphite sheet is composed of compressed, expanded graphite particles and having anisotropic electrical properties.

9. An electrical capacitor comprising a housing, at least one pair of spaced carbon paste electrodes in said housing, said electrodes being compressed from a viscous paste of carbon particles and an electrolyte, an ionically-conductive separator means between and in contact with said electrodes electronically separating said electrodes from each other, and an impervious electron-conducting, ion insulating connector positioned adjacent to the outerside of each of said electrodes, each of said impervious connectors comprising two layers of a thin, flexible, graphite sheet having interposed therebetween an ion-insulating elastomer having electrically-conductive carbon black blended therein for imparting electrical conductivity thereto, said elastomer and graphite layers forming an electronically conductive, ion-insulating, sandwich structure.

10. The capacitor in claim 9 wherein the elastomer in the graphite-elastomer composite is cured by vulcanizing.

11. A process for producing an electron-conducting, ion-insulating, impervious connector for use in an electrical capacitor comprising:
   a. interposing between two layers of thin, flexible graphite a layer of electrically-conducting elastomer containing electrically-conductive carbon black in admixture therewith, forming a graphite-elastomer composite; and
   b. pressure-curing the graphite-elastomer composite obtained in (a) at a temperature of from about room temperature to 220° C and at a pressure of from about 15 to 13,500 psi.

12. The process in claim 11 wherein the elastomer is selected from the group consisting of butyl rubber and chlorobutyl rubber.

13. The process in claim 12 wherein the graphite-elastomer composite is cured by vulcanizing.

14. The process in claim 13 wherein the carbon-filled elastomer layer is pre-pressed before interposing between the two layers of graphite.

15. The process in claim 13 wherein the elastomer has blended therein from about 50 to 200 parts by weight of electrically-conductive carbon black per 100 parts of elastomer.

16. The process in claim 15 wherein the graphite sheet has a thickness ranging from about 0.3 to 10 mils.

17. The process in claim 16 wherein the elastomer layer has a thickness ranging from about 2 to 10 mils.

* * * * *